US008919543B2

(12) United States Patent
Jorgensen et al.

(10) Patent No.: US 8,919,543 B2
(45) Date of Patent: Dec. 30, 2014

(54) SIDE COVER FOR CONVEYOR

(71) Applicant: Caterpillar Paving Products Inc., Minneapolis, MN (US)

(72) Inventors: John E. Jorgensen, Andover, MN (US); Alan Z. Hsieh, Brooklyn Park, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 0 days.

(21) Appl. No.: 13/659,118

(22) Filed: Oct. 24, 2012

(65) Prior Publication Data
US 2014/0110229 A1    Apr. 24, 2014

(51) Int. Cl.
*B65G 21/00*    (2006.01)
(52) U.S. Cl.
USPC ..................... 198/860.3; 198/860.5
(58) Field of Classification Search
USPC ....................................................... 198/860.3
See application file for complete search history.

(56) References Cited

U.S. PATENT DOCUMENTS

| 4,093,066 | A | 6/1978 | Mitchell et al. |
| 6,551,234 | B1* | 4/2003 | Martello ......................... 600/15 |
| 8,235,235 | B1* | 8/2012 | Lusch ............................ 220/230 |
| 2006/0231469 | A1* | 10/2006 | Baehring et al. ................ 210/85 |
| 2012/0048134 | A1* | 3/2012 | DeMoore ................... 101/401.1 |
| 2012/0273328 | A1* | 11/2012 | Sejourne ....................... 198/788 |
| 2013/0156355 | A1* | 6/2013 | Levsen ............................ 384/91 |
| 2013/0239523 | A1* | 9/2013 | Scudder et al. ................. 53/467 |

FOREIGN PATENT DOCUMENTS

| JP | 52053373 | 4/1977 |
| JP | 8026441 | 1/1996 |

* cited by examiner

*Primary Examiner* — Ramya Burgess
*Assistant Examiner* — Lester Rushin
(74) *Attorney, Agent, or Firm* — Miller, Matthias & Hull

(57) ABSTRACT

A side cover is provided for a conveyor. The side cover includes a first edge and a second edge. The second edge is substantially parallel to the first edge. Further, a magnet is coupled to the first edge. The magnet is configured to couple the side cover to the conveyor.

5 Claims, 5 Drawing Sheets

SIDE COVER FOR CONVEYOR

TECHNICAL FIELD

The present disclosure relates to a covering structure and, more particularly, to a side cover for a conveyor.

BACKGROUND

Covers are mounted onto a conveyor of a machine to protect persons from crushing and shearing hazards. Covers are also beneficial for keeping dust contained and keeping the material on the conveyor. Apart from providing protective coverage, the covers also allow easy access to components of the conveyor for servicing and cleaning purposes. Accordingly, mechanisms used to mount or attach the cover to the conveyor should facilitate in ease of assembly and removal of the cover.

Typically, the known mounting solutions include bungee cords with hooks, grommets, and/or leather straps with buckles. However, these mechanisms are time consuming to attach and detach the cover from the conveyor and require intense manual effort. Hence, there is a need to provide an improved mounting means on the cover.

For example, U.S. Pat. No. 4,093,066 relates to a cover for acoustically enclosing a conveyor. The cover includes a curved, dome-shaped or gabled top portion and two side walls which project downwardly from the top portion to a support structure for the conveyor. At least one of the side walls includes a pivotally mounted door which provides access to the conveyor. However, this design does not allow easy access to the conveyor.

SUMMARY OF THE DISCLOSURE

In one aspect of the present disclosure a side for a conveyor having a rail is provided. The side cover includes a first edge and a second edge. The second edge is substantially parallel to the first edge. Further, a magnet is coupled to the first edge. The magnet is configured to couple the side cover to the rail.

In another aspect, a side cover for a conveyor is provided. The side cover includes a first mounting structure and a second mounting structure. The first mounting structure is a magnet provided at a first edge of the side cover. The first mounting structure is configured to couple the first edge to the conveyor. The second mounting structure is provided at a second edge of the side cover. The second mounting structure is configured to couple the second edge to the conveyor.

In yet another aspect, a machine having a frame is provided. A conveyor is coupled to the frame. The conveyor has a first rail and a second rail. A side cover for the conveyor is provided. The side cover includes a first edge and a second edge substantially parallel to the first edge. Further, a magnet is coupled to at least one of the first and the second edges. The magnet is configured to removably couple the side cover to at least one of the first and second rails of the conveyor.

Other features and aspects of this disclosure will be apparent from the following description and the accompanying drawings.

DETAILED DESCRIPTION

Figure 1:
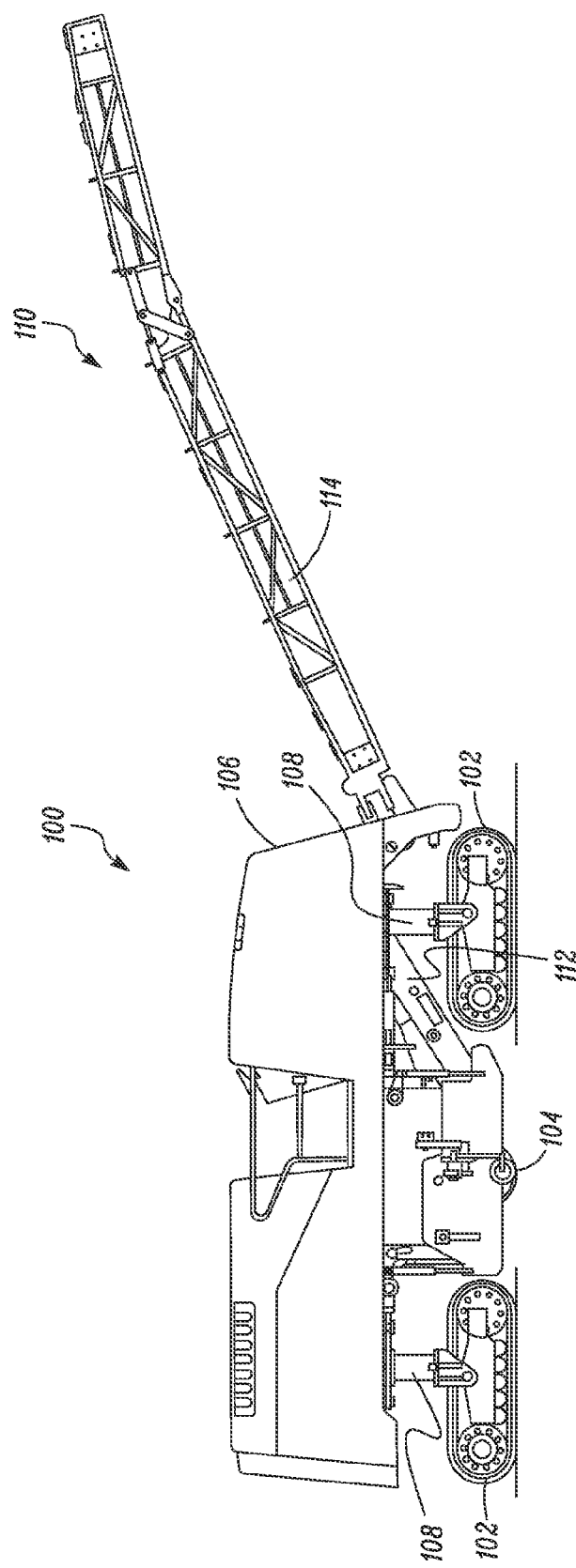
FIG. 1 illustrates an exemplary machine, according to one embodiment of the present disclosure.

The present disclosure will now be described in detail with reference being made to accompanying figures. An exemplary machine 100 in which disclosed embodiments may be implemented is schematically illustrated in FIG. 1. In the accompanying drawings, the machine 100 is illustrated as a cold planer machine.

The machine 100 includes a plurality of drive tracks 102 configured for propelling the machine 100 along a road surface. The machine 100 also includes an implement 104, such as a cutting drum, supported on the machine 100. The implement 104 facilitates in milling the road surface. A cutting plane of the machine 100 is tangent to the bottom of the implement 104 and parallel to the direction of travel of the machine 100. The drive tracks 102 of the machine 100 are connected to a frame 106 of the machine 100 by hydraulic legs 108. The hydraulic legs 108 are configured to raise and lower the implement 104 relative to the drive tracks 102 so as to control a depth of cut for the implement 104.

The machine 100 is further equipped with a conveyor 110 configured to transport excavated asphalt, or other material used when paving, from the implement 104 to a discharge location (not shown), such as the bed of a dump truck. The conveyor 110 includes a lower conveyor belt 112 and an upper conveyor belt 114. The upper conveyor belt 114 can be moved or pivoted relative to the lower conveyor belt 112 in a vertical and horizontal direction so as to properly adjust the conveyor 110 with regard to the discharge location (not shown). Preferably, as shown in the accompanying figures, the upper conveyor belt 114 is foldable so as to reduce its total length during transportation of the machine 100.

Figure 2:
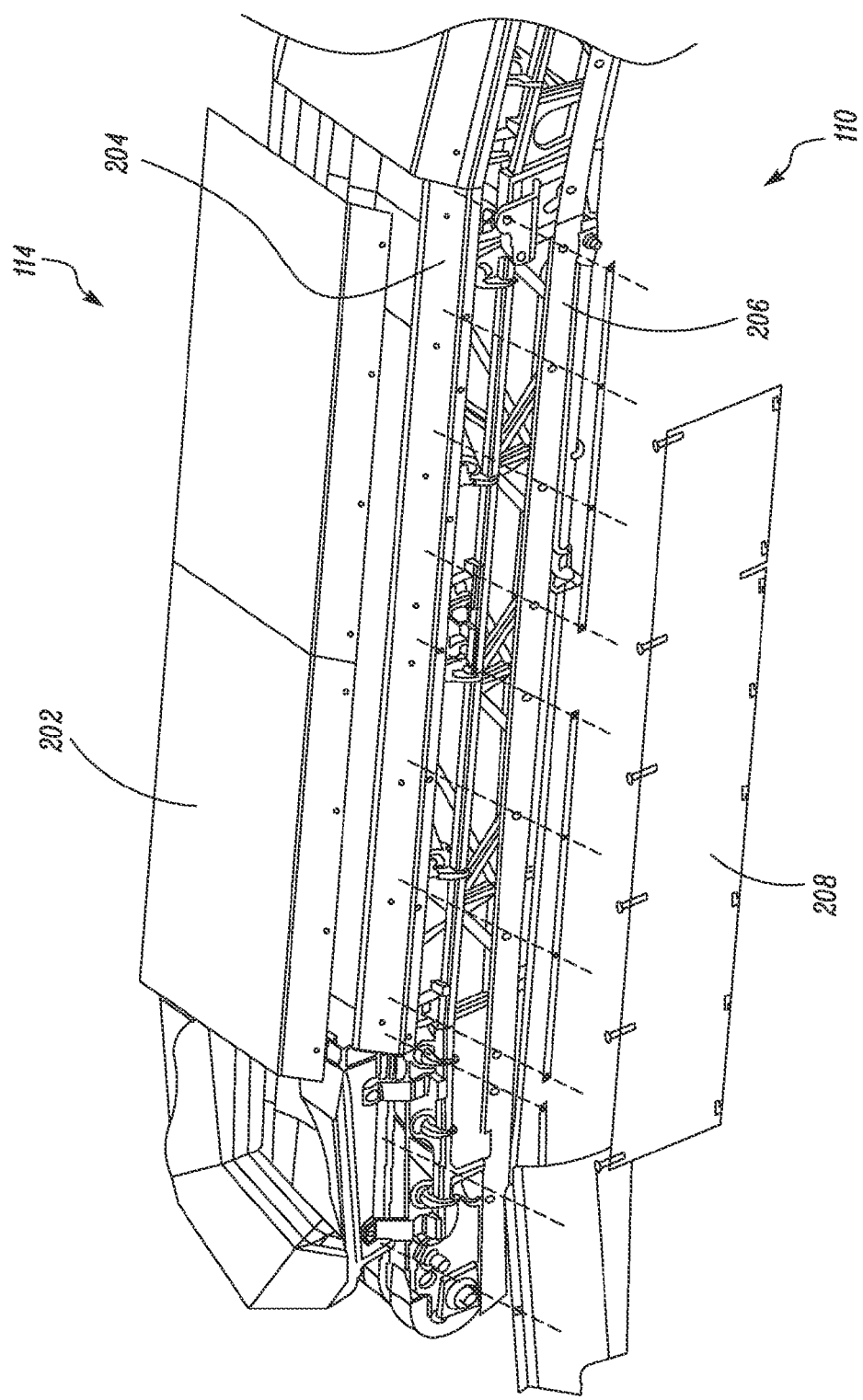
FIG. 2 is an exploded view of a conveyor of the machine and a side cover for attachment to the conveyor.

Moreover, the upper conveyor belt 114 can also be moved towards the lower conveyor belt 112 so as to properly load the transported material from the lower conveyor belt 112 onto the upper conveyor belt 114. FIG. 2 is an exploded view of the upper conveyor belt 114 of the conveyor 110. Referring to FIG. 2, the conveyor 110 is covered by a hood structure 202 on the upper conveyor belt 114. The hood structure 202 joins to a second rail 204 of the conveyor 110. The hood structure 202 typically forms a material directing compartment on the conveyor 110. A hollow space is formed between the first rail 206 and a second rail 204 of the conveyor 110. The space contains components including, but not limited to, rollers, belts, an internal support structure, and the like.

The present disclosure relates to a side cover 208 which can be attached to the conveyor 110, and can also be either fully or partially removed from the conveyor 110. As shown by the dotted lines in FIG. 2, the side cover 208 is attached to the first rail 206 and the second rail 204 of the conveyor 110. The side cover 208 provides protective coverage when attached to the conveyor 110 protecting people near the machine 100 and preventing materials on the conveyor 110 from falling from the conveyor 110.

Moreover, when the side cover 208 is at least partially detached from the conveyor 110, an operator will have access to service the components present between the first and second rails 206, 204 of the conveyor 110. An example of the side cover 208 in a partially detached position would be similar to a hinged position, where the side cover 208 is lifted and detaches from the first rail 206 but remains coupled to the second rail 204 to open and provide the operator access to the hollow space of conveyor 110. The side cover 208 may also prevent unintended access to the conveyor 110. In one embodiment, the side cover 208 is made of plastic. Alternatively, the side cover 208 may be made of any other suitable material, including, but not limited to, fabrics and metals.

Figure 3:
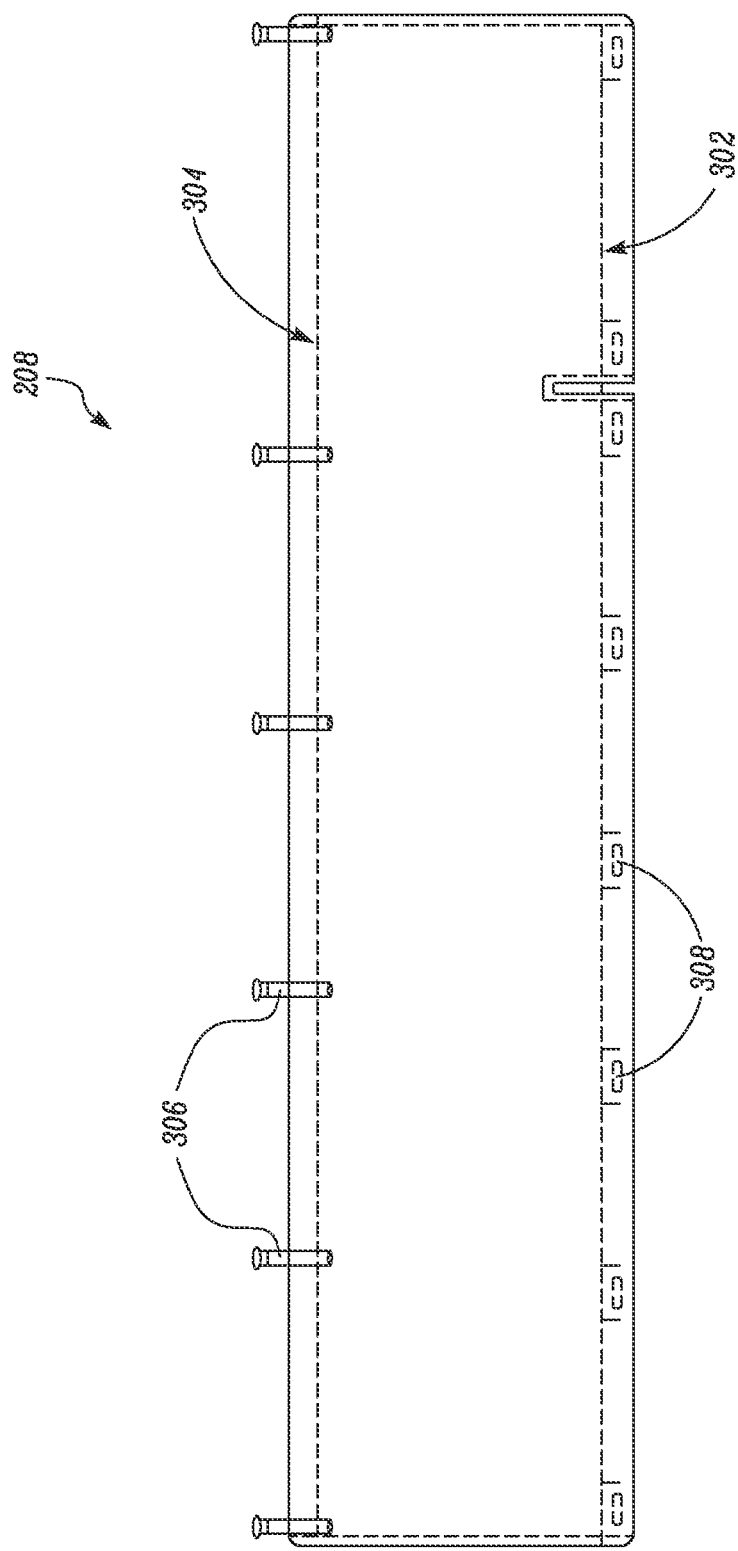
FIG. 3 is a diagrammatic view of the side cover.

FIG. 3 is an enlarged view of the side cover 208. As shown, in one embodiment, the side cover 208 has a substantially rectangular configuration. The side cover 208 includes a first edge 302 and a second edge 304. The second edge 304 is substantially parallel to the first edge 302. Moreover, the side cover 208 includes a first mounting structure provided at the first edge 302. The first mounting structure removably attaches the first edge 302 of the side cover 208 to the second rail 206 of the conveyor 110. The first mounting structure may include a magnet 308 fastened to the first edge 302 of the side cover 208. It should be noted that the edges of the side cover 208 described herein are not restricted to merely the boundaries of the side cover 208, but also include the area of the side cover 208 proximate to the edges, as shown in the accompanying figures.

Further, the side cover 208 includes a second mounting structure provided at the second edge 304 of the side cover 208, in order to removably attach the second edge 304 to the second rail 204 or hood structure 202 of the conveyor 110. The second mounting structure may include a plurality of straps 306. The plurality of straps 306 are configured to be mounted to the conveyor. As an example, the strap 306 on the side cover 208 could include a latch, and the conveyor 110 could include a corresponding receptacle for the latch. A person of ordinary skill in the art will appreciate that such straps 306 are known in the art. The straps 306 are each affixed to the second edge 304 of the side cover 208 at a first end. A second end of each strap 306 may be fastened to the second rail 204 or the corresponding receptacle of the conveyor 114 by a variety of methods, including but not limited to hooks, magnets, or latches. The holder in turn is affixed within slots provided on a skirtboard of the conveyor 110.

For removal, the strap 306 needs to be manually unbuckled from the holder, leading to a time consuming process. Parameters such as spacing between each of the plurality of straps 306, size and shape of the straps 306, and the like may vary. It should be noted that the second mounting structure described herein is merely on an exemplary basis and does limit the scope of this disclosure. Any other such similar mounting means known in the art may also be utilized. It should also be appreciated that the conveyor 110 could include a plurality of straps 306 with the corresponding mounts located on the side cover 208.

The combination of the first and second mounting structures is used to attach and remove the side cover 208 from the conveyor 110. A person of ordinary skill in the art will appreciate that the magnet 308 facilitates an easy assembly and removal of the side cover 208 from the conveyor 110, and thereby considerably reduces time required for the installation and removal process.

The magnet 308 may either include a single continuous piece or a spaced apart arrangement of a plurality of the magnets 308. It should be noted that parameters related to shape and size of the magnet 308, spacing between two consecutive magnets 308, strength of the magnet 308, number of the magnets 308 used, and the like, may vary based on the application. For example, in FIG. 3, eight magnets 308 are spaced apart at the second edge 304 of the side cover 208.

A person of ordinary skill in the art will appreciate that although the magnets 308 described herein are attached to the first edge 302 of the side cover 208, in other embodiments, the magnets 308 may be provided on other portions of the side cover 208. For example, the second mounting structure may be a second magnet. The second magnet is provided on the second edge 304 of the side cover 208. It should be noted that the second magnet may be considered as an embodiment of the magnets 308. The second magnets described herein are given a different name from the magnets 308 merely to differentiate based on placement of the second magnet on the side cover 208. Moreover, in another embodiment, the magnets 308 may be located on multiple areas of the side cover 208, for example, both the first and second edges 302, 304. Alternatively, in yet another arrangement, any one of the first or second edges 302, 304 may be fixedly attached to the conveyor 110, while the other edge of the side cover 208 may include the magnets 308.

It should be understood that the magnet 308 can be fastened to the side cover 208 in a variety of ways, such that the magnet 308 is either in direct or indirect contact with the conveyor 110. In one embodiment, the magnet 308 may be stuck onto the side cover 208 using a suitable adhesive. In another embodiment, the magnet 308 may be housed within the side cover 208.

For example, the side cover 208 may be folded to form a pocket like structure at the second edge 304. The magnet 308 can be placed within the pocket like structure and sealed at free ends, in order to hold the magnet 308 in place. Alternatively, a combination of the above mentioned methods or any other technique known in the art may also be utilized. It should also be appreciated that the conveyor 110 could include the magnet 308 which would hold a metallic side cover 208 to the conveyor 110. Alternatively, the magnet 308 in the side cover 208 could correspond to a polar opposite magnet placed on the conveyor 110 to assist with holding the side cover 208 against the conveyor 110.

Figure 4:
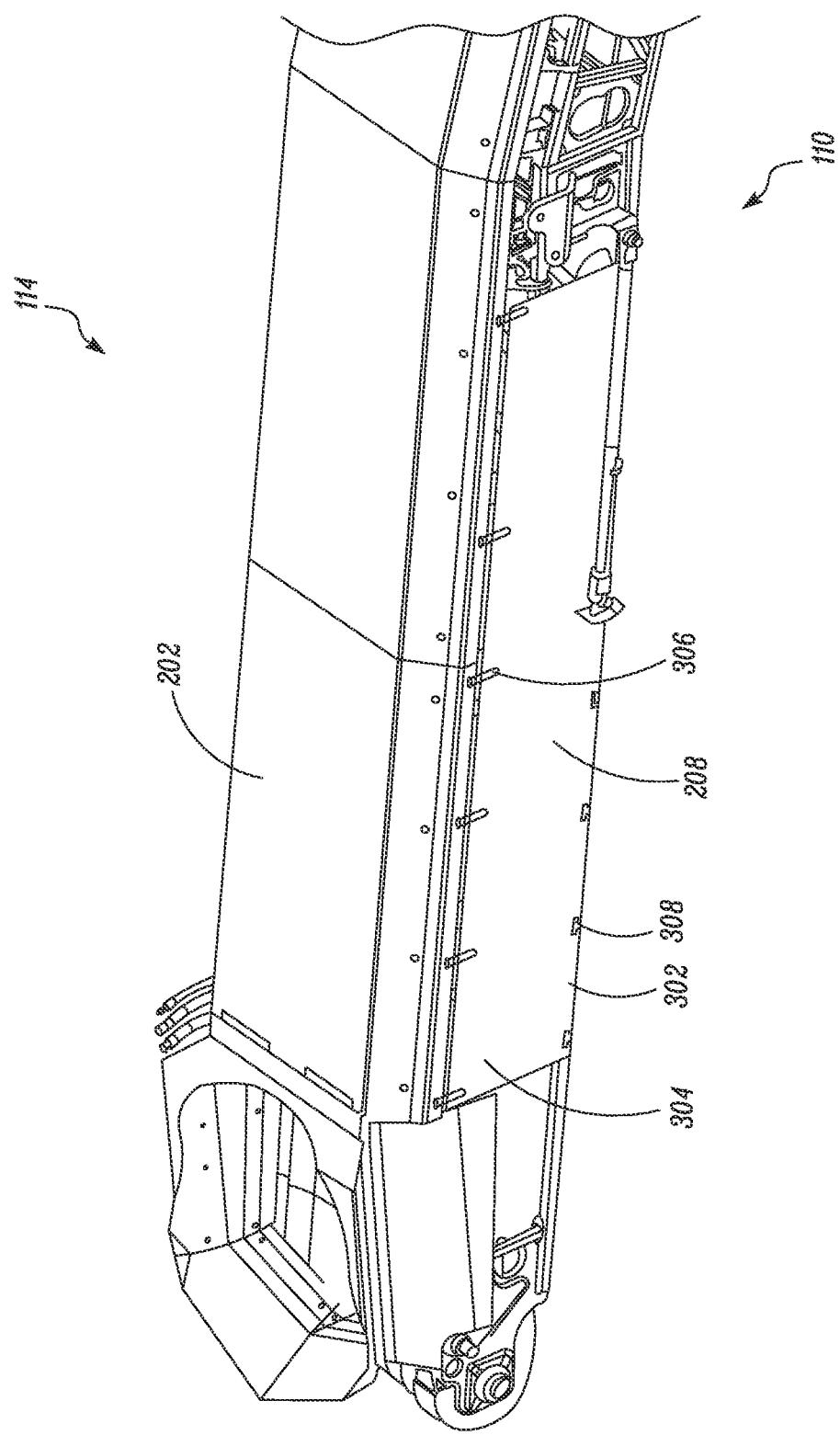
FIGS. 4 and 5 are different views of the conveyor with the attached side cover.
Figure 5:
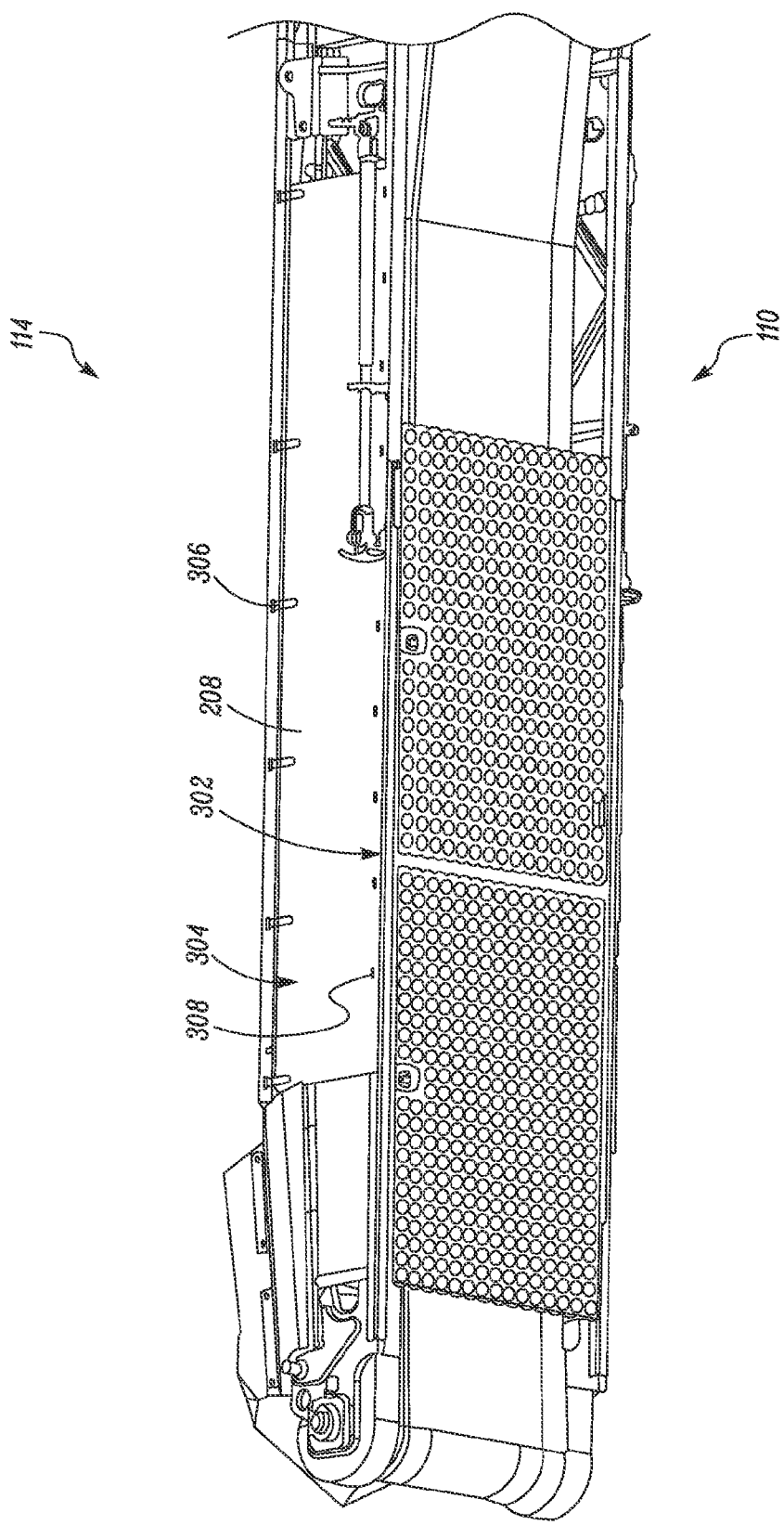

FIGS. 4 and 5 are various views of the side cover 208 when attached to the conveyor 110. It should be noted that the side cover 208 may be partially detached or completely detached from the conveyor 110 in order to access the components of the conveyor 110 for servicing. The side cover 208 may be at least partially detached from the conveyor 110 by pulling the side cover 208 and releasing the magnets 308 which are coupling the side cover 208 to the conveyor 110.

When removed, the side cover 208 may accordingly be rolled-up or flipped-up against a side of the conveyor 110. For example, in order to access the components of the conveyor 110 for servicing, the operator may pull free the magnets 308 located on the first edge 302 of the side cover 208, while the second edge 304 of the side cover 208 remains attached to the conveyor 110. Depending on the material the side cover 208 is made out of, the side cover 208 may be rolled up or flipped up and allowed to rest on the hood structure 202. By removing the straps 306, the entire side cover 208 can be removed from the conveyor 110. As shown in FIG. 5, the side cover 208 may be provided on either side of the conveyor 110. Alternatively, the side cover 208 may also be provided on both the left and right sides of the conveyor 110.

INDUSTRIAL APPLICABILITY

Protective measures, typically in the form of covers, are provided on the conveyor 110 of the machine 100 for safety from injury caused by dust or ejected material. Known solutions include covers which are secured to the conveyor 110 using bungee cords with hooks, grommets, and/or straps. However installation and removal of these covers may be a laborious and time consuming process.

The present disclosure described herein relates to the side cover 208 which is provided with the magnet 308. The magnet 308 may facilitate in easy holding of the side cover 208 on the conveyor 110, eliminating the need of any additional mounting provisions. Hence, this design may reduce cost and complexity. Moreover, the side cover 208 may be detached from the conveyor 110 by pulling the side cover 208 and freeing the magnet 308 from the conveyor 110, thereby considerably reducing de-installation time. On removal of the side cover 208, the components of the conveyor 110 may easily be serviced or cleaned.

Once the components of the conveyor 110 are serviced, the side cover 208 may be re-installed by lowering it back into place, thereby providing ease of installation. The installed side cover 208 may provide protective coverage during operation of the conveyor 110. One of ordinary skill in the art will appreciate that the side cover 208 may also be utilized on other machines that make use of the conveyor mechanism such as quarry trucks.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A machine comprising:
 a frame;
 a conveyor coupled to the frame, the conveyor including a first rail and a second rail, the first rail being disposed below and parallel to the second rail, the conveyor further including a hood disposed above the second rail; and
 a side cover for the conveyor, the side cover comprising:
  a straight first edge;
  a straight second edge substantially parallel to the first edge;
  at least one magnet coupled to the first edge, the at least one magnet configured to detachably couple the first edge of the side cover to the first rail of the conveyor; and
 a plurality of straps, each strap having a first end coupled to the second edge of the side cover and a second end coupled to the conveyor,
 wherein the at least one magnet and the first edge of the side cover may be decoupled from the first rail while the second edge of the side cover and the second end of the straps remain coupled to the conveyor as the at least one magnet and first edge of the side cover are flipped upward on top of the hood.

2. The side cover of claim 1, wherein the at least one magnet is coupled to the first edge of the side cover using an adhesive.

3. The side cover of claim 1, wherein the at least one magnet is located within the side cover along the first edge.

4. The machine of claim 1, wherein the machine is a cold planer machine.

5. The side cover of claim 1, wherein the at least one magnet is a plurality of magnets spaced apart along the first edge.

* * * * *